(12) United States Patent
Siclovan et al.

(10) Patent No.: US 6,462,168 B1
(45) Date of Patent: Oct. 8, 2002

(54) WEATHERABLE POLYCARBONATES COMPRISING OXANILIDE STRUCTURAL UNITS, METHOD, AND ARTICLES MADE THEREFROM

(75) Inventors: Tiberiu Mircea Siclovan, Rexford, NY (US); Daniel Joseph Brunelle, Burnt Hills, NY (US); James Edward Pickett, Schenectady, NY (US); Joseph Anthony Suriano, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/842,616

(22) Filed: Apr. 25, 2001

(51) Int. Cl.$^7$ ................................................ C08G 64/00
(52) U.S. Cl. ...................................... 528/196; 528/198
(58) Field of Search ................................... 528/196, 198

(56) References Cited

U.S. PATENT DOCUMENTS

| | | |
|---|---|---|
| 3,683,020 A | 8/1972 | Luethi et al. |
| 3,906,033 A | 9/1975 | Biland et al. |
| 3,989,672 A | 11/1976 | Vestergaard |
| 4,217,438 A | 8/1980 | Brunelle et al. |
| 4,496,676 A | 1/1985 | Dexter et al. |
| 5,569,674 A | 10/1996 | Yokoyama et al. |
| 5,587,151 A | 12/1996 | Richard et al. |
| 5,698,732 A | 12/1997 | Likibi |
| 5,847,196 A | 12/1998 | Likibi |
| 5,869,554 A | 2/1999 | Pickett et al. |
| 5,880,248 A | 3/1999 | Sakashita et al. |
| 6,136,441 A | 10/2000 | MacGregor et al. |

OTHER PUBLICATIONS

"Polycarbonates" in Kirk–Othmer Encyclopedia of Chemical Technology , Fourth Edition, vol. 19, pp. 585–600.
"Bilvalent Ligand Typeβ–Adrenolytics Related To Practolol", Bioscience Ediprint Inc., A. Rampa et al, 1988, pp. 581–586.

*Primary Examiner*—Terressa M. Boykin
(74) *Attorney, Agent, or Firm*—S. Bruce Brown; Noreen C. Johnson

(57) ABSTRACT

In one embodiment the present invention is a polycarbonate comprising structural units derived from at least one dihydric phenol, a carbonate precursor, and at least one member selected from the group consisting of an oxanilide-comprising compound, an oxamate-comprising compound, and mixtures thereof. In another embodiment the present invention is a method for making a polycarbonate comprising structural units derived from at least one dihydric phenol and at least one member selected from the group consisting of an oxanilide-comprising compound, an oxamate-comprising compound, and mixtures thereof, which comprises the step of contacting under reactive conditions at least one dihydric phenol, a carbonate precursor, and at least one member selected from the group consisting of an oxanilide-comprising compound, an oxamate-comprising compound, and mixtures thereof. In still another embodiment the present invention is an article comprising a polycarbonate comprising oxanilide structural units. In still another embodiment the present invention is a method for making a symmetrical or unsymmetrical oxanilide-comprising dihydric phenol which comprises the step of contacting at least one aromatic amine bearing a hydroxy group with a diaryl oxalate or a dialkyl oxalate bearing alkyl groups each substituted with at least one electron-withdrawing group. In still another embodiment the present invention is a method for making an oxamate-comprising monohydric phenol which comprises the step of contacting an aromatic amine bearing a hydroxy group with a diaryl oxalate or a dialkyl oxalate bearing alkyl groups each substituted with at least one electron-withdrawing group.

91 Claims, 3 Drawing Sheets

WEATHERABLE POLYCARBONATES COMPRISING OXANILIDE STRUCTURAL UNITS, METHOD, AND ARTICLES MADE THEREFROM

BACKGROUND OF THE INVENTION

The present invention is directed to polycarbonate polymers which are resistant to weathering. More particularly, the present invention is directed to polycarbonate polymers comprising oxanilide structural units, methods for producing them, and articles made therefrom.

Polycarbonates are a widely employed class of polymers, in part because of their excellent physical properties including high impact strength. However, the resistance of polycarbonates to change upon exposure to weather phenomena (generally termed "weatherability") is not ideal. In particular, long term color stability is a problem as polycarbonates are subject to yellowing, which detracts from the transparency and attractiveness of the polymers. Yellowing of polycarbonates is caused largely by the action of ultraviolet radiation, which is why such yellowing is frequently referred to as "photoyellowing". Numerous means for suppressing photoyellowing and other detrimental phenomena associated with weathering have been employed and proposed. Many of these involve incorporation in polycarbonate compositions of ultraviolet absorbing compounds (UVA's). For the most part, UVA's are low molecular weight compounds and they must be employed at relatively low levels, typically up to no more than about 1% by weight, to avoid degradation of the physical properties of the polymer such as impact strength and high temperature properties as reflected in heat distortion temperature. A long-felt need exists for polycarbonate compositions with effective resistance to weathering which do not require the addition of low molecular weight UVA's.

An example of a typical UVA is an oxanilide-comprising compound available under the trade name SANDUVOR VSU from Clariant Corporation and having the formula (I):

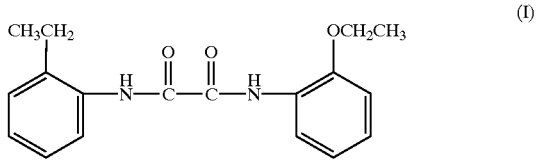

(I)

Commonly assigned U.S. Pat. No. 5,847,196 discloses a synthesis of mono- and difunctional oxanilides containing aromatic hydroxy functionality. However, the oxanilides made by the method taught therein are themselves highly colored. Also, there is no teaching therein of polycarbonates which might be derived from such oxanilides. There is a need for a method for preparing oxanilides containing aromatic hydroxy functionality which produces oxanilides with little or no color, which can be used to prepare essentially colorless, transparent polycarbonates.

SUMMARY OF THE INVENTION

After diligent experimentation the present inventors have discovered polycarbonates comprising oxanilide structural units which are essentially colorless and which exhibit excellent weatherability. Thus, in one embodiment the present invention is a polycarbonate comprising structural units derived from at least one dihydric phenol, a carbonate precursor, and at least one member selected from the group consisting of an oxanilide-comprising compound, an oxamate-comprising compound, and mixtures thereof. In another embodiment the present invention is a method for making a polycarbonate comprising structural units derived from at least one dihydric phenol and at least one member selected from the group consisting of an oxanilide-comprising compound, an oxamate-comprising compound, and mixtures thereof, which comprises the step of contacting under reactive conditions at least one dihydric phenol, a carbonate precursor, and at least one member selected from the group consisting of an oxanilide-comprising compound, an oxamate-comprising compound, and mixtures thereof. In still another embodiment the present invention is an article comprising a polycarbonate comprising oxanilide structural units. In still another embodiment the present invention is a method for making a symmetrical or unsymmetrical oxanilide-comprising dihydric phenol which comprises the step of contacting at least one aromatic amine bearing a hydroxy group with a diaryl oxalate or a dialkyl oxalate bearing alkyl groups each substituted with at least one electron-withdrawing group. In still another embodiment the present invention is a method for making an oxanilide-comprising monohydric phenol which comprises the step of contacting an aromatic amine bearing a hydroxy group with a diaryl oxalate or a dialkyl oxalate bearing alkyl groups each substituted with at least one electron-withdrawing group. Various other features, aspects, and advantages of the present invention will become more apparent with reference to the following description and appended claims.

DETAILED DESCRIPTION OF THE INVENTION

Figure 1:
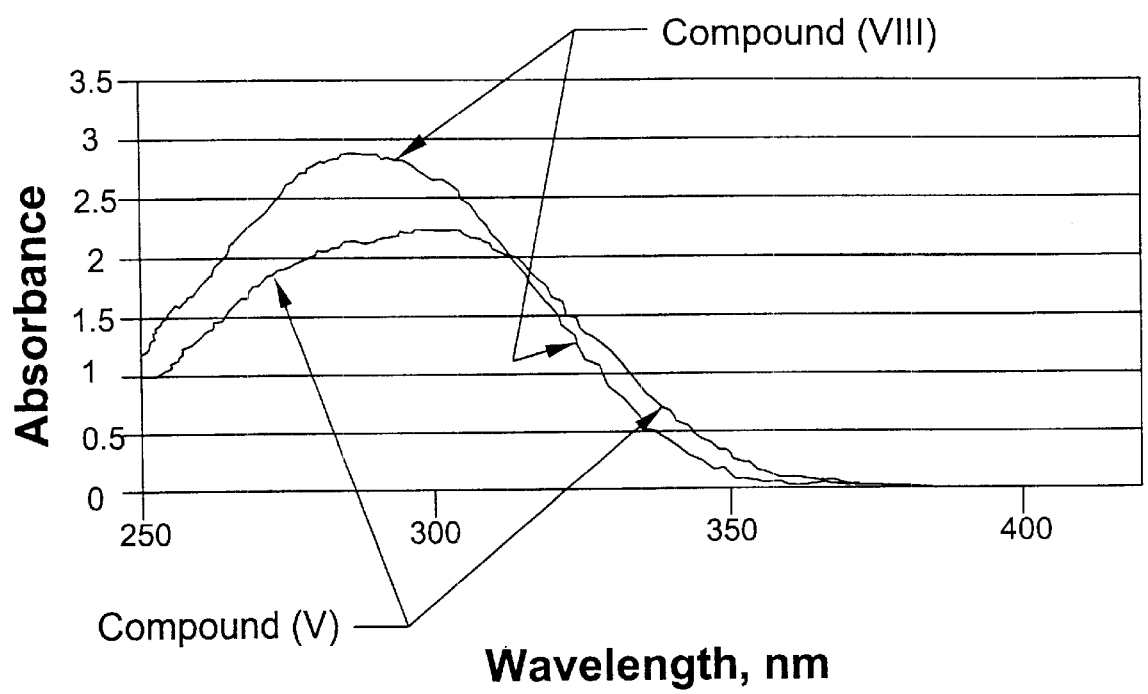
FIG. 1 shows the ultraviolet spectra for the bis(phenyl carbonate) derivative of compound (V) and the monophenyl carbonate derivative of compound (VIII).

Oxanilide-comprising compounds in various embodiments of the present invention include oxanilide-comprising dihydric phenols of formula (II):

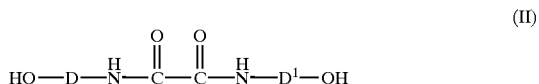

(II)

wherein D and $D^1$ are each independently a divalent aromatic radical. In arious embodiments D and $D^1$ independently have the structure of formula (III);

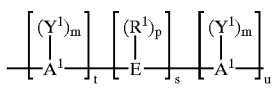

(III)

wherein $A^1$ represents an aromatic group such as phenylene, biphenylene, naphthylene, etc. E may be an alkylene or alkylidene group including, but not limited to, methylene, ethylene, ethylidene, propylene, propylidene, isopropylidene, butylene, butylidene, isobutylidene, amylene, amylidene, isoamylidene. When E is an alkylene or alkylidene group, it may also consist of two or more alkylene or alkylidene groups connected by a moiety different from alkylene or alkylidene, such as an aromatic linkage; a tertiary amino linkage; an ether linkage; a carbonyl linkage; a silicon-containing linkage; or a sulfur-containing linkage including, but not limited to, sulfide, sulfoxide, sulfone; or a phosphorus-containing linkage including, but not limited to, phosphinyl, phosphonyl. In addition, E may be a cycloaliphatic group including, but not limited to, cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene; a sulfur-containing linkage, such as sulfide, sulfoxide or sulfone; a phosphorus-containing linkage, such as phosphinyl or phosphonyl; an ether linkage; a carbonyl group; a tertiary nitrogen group; or a silicon-containing linkage such as silane or siloxy. $R^1$ represents hydrogen or a monovalent hydrocarbon group such as alkyl, aryl, aralkyl, alkaryl, or cycloalkyl. In various embodiments a monovalent hydrocarbon group of $R^1$ may be halogen-substituted, particularly fluoro- or chloro-substituted, for example as in dichloroalkylidene. $Y^1$ may be an inorganic atom including, but not limited to, halogen (fluorine, bromine, chlorine, iodine); an inorganic group including, but not limited to, nitro; an organic group including, but not limited to, a monovalent hydrocarbon group such as alkyl, aryl, aralkyl, alkaryl, or cycloalkyl, or an oxy group such as $OR^2$, wherein $R^2$ is a monovalent hydrocarbon group such as alkyl, aryl, aralkyl, alkaryl, or cycloalkyl; it being only necessary that $Y^1$ be inert to and unaffected by the reactants and reaction conditions used to prepare a polycarbonate. The letter "m" represents any integer from and including zero through the number of positions on $A^1$ available for substitution; "p" represents an integer from and including zero through the number of positions on E available for substitution; "t" represents an integer equal to at least one; "s" is either zero or one; and "u" represents any integer including zero.

In the context of the present invention alkyl radicals or groups are typically those containing from 1 to about 18 carbon atoms, and include branched alkyl radicals and straight chain alkyl radicals. Some illustrative non-limiting examples of these alkyl radicals include methyl, ethyl, propyl, isopropyl, butyl, tertiary-butyl, pentyl, neopentyl, and hexyl. Cycloalkyl radicals or groups are typically those containing from 3 to about 12 ring carbon atoms. Some illustrative non-limiting examples of these cycloalkyl radicals include cyclobutyl, cyclopentyl, cyclohexyl, methylcyclohexyl, cycloheptyl. Aryl radicals or groups are typically those containing from 6 to 12 ring carbon atoms. Some illustrative non-limiting examples of these aryl radicals include phenyl, biphenyl, naphthyl. Typical aralkyl and alkaryl radicals or groups are those containing from 7 to about 24 carbon atoms. These include, but are not limited to, benzyl, ethylphenyl, phenylbutyl, phenylpropyl, propylphenyl, and phenylethyl.

When more than one Y substituent is present as represented by formula (III) above, they may be the same or different. When more than one $R^1$ substituent is present, they may be the same or different. Where "s" is zero in formula (III) and "u" is not zero, the aromatic rings are directly joined with no intervening alkylidene or other bridge. The positions of the hydroxyl groups and $Y^1$ on the aromatic residues $A^1$ can be varied in the ortho, meta, or para positions and the groupings can be in vicinal, asymmetrical or symmetrical relationship, where two or more ring carbon atoms of the aromatic residue are substituted with $Y^1$ and hydroxyl groups.

In one embodiment D and $D^1$ of formula (II) are the same and the compound is a symmetrical oxanilide-comprising dihydric phenol. In another embodiment D and $D^1$ of formula (II) are different and the compound is an unsymmetrical oxanilide-comprising dihydric phenol. In a particular embodiment oxanilide-comprising dihydric phenols of formula (II) include those of formula (IV):

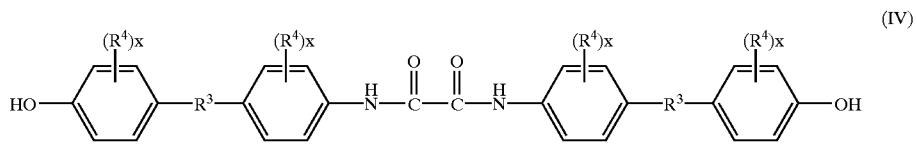

(IV)

wherein $R^3$ is an alkylene, alkylidene, or cycloaliphatic group including, but not limited to, methylene, ethylene, ethylidene, propylene, propylidene, isopropylidene, butylene, butylidene, isobutylidene, amylene, amylidene, isoamylidene, cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene, dichloroalkylidene; $R^4$ is halogen, bromo, chloro, alkyl, aryl, aralkyl, alkaryl, cycloalkyl, or $OR^2$, wherein $R^2$ is a monovalent hydrocarbon group such as alkyl, aryl, aralkyl, alkaryl, or cycloalkyl; and "x" represents any integer from and including zero through the number of positions on the aromatic ring available for substitution. When present, any $R^4$ substituent may be ortho or meta to the heteroatom-aromatic ring linkage. In another particular embodiment $R^3$ in formula (IV) is isopropylidene and "x" is zero, which compound is N,N'-bis[4-[1-(4-hydroxyphenyl)-1-methylethyl]phenyl]-ethanediamide, also referred to herein as compound (V).

Oxanilide-comprising compounds in various embodiments of the present invention also include oxanilide-comprising monohydric phenols of formula (VI):

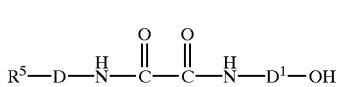
(VI)

wherein D and $D^1$ are each independently a divalent aromatic radical and $R^5$ is hydrogen or a monovalent hydrocarbon group such as alkyl, aryl, aralkyl, alkaryl, or cycloalkyl; an inorganic atom including, but not limited to, halogen (fluorine, bromine, chlorine, iodine); an inorganic group including, but not limited to, nitro; or an oxy group such as $OR^2$, wherein $R^2$ is a monovalent hydrocarbon group such as alkyl, aryl, aralkyl, alkaryl, or cycloalkyl; it being only necessary that $R^5$ be inert to and unaffected by the reactants and reaction conditions used to prepare a polycarbonate. In various embodiments D and $D^1$ each independently have the structure of formula (III);

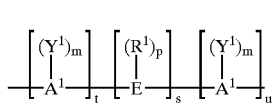
(III)

wherein $A^1$, $Y^1$, E, $R^1$, m, p, t, s, and u have the same definition and scope as defined hereinabove.

In a particular embodiment oxanilide-comprising monohydric phenols of formula (VI) include those of formula (VII):

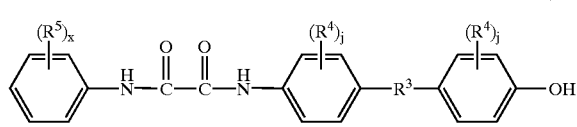
(VII)

wherein $R^3$ is an alkylene, alkylidene, or cycloaliphatic group including, but not limited to, methylene, ethylene, ethylidene, propylene, propylidene, isopropylidene, butylene, butylidene, isobutylidene, amylene, amylidene, isoamylidene; cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene, dichloroalkylidene; $R^4$ and $R^5$ are each independently halogen, bromo, chloro, alkyl, aryl, aralkyl, alkaryl, cycloalkyl, or $OR^2$, wherein $R^2$ is a monovalent hydrocarbon group such as alkyl, aryl, aralkyl, alkaryl, or cycloalkyl, and "x" and "j" represent any integer from and including zero through the number of positions on the aromatic ring available for substitution. When present, any $R^4$ substituent may be ortho or meta to the heteroatom-aromatic ring linkage, and any $R^5$ substituent may be ortho, meta, or para to the heteroatom-aromatic ring linkage. In another particular embodiment $R^3$ in formula (VII) is isopropylidene; "j" is zero; "x" is one; and $R^5$ is $OCH_2CH_3$ ortho to the heteroatom-aromatic ring linkage, which compound is sometimes referred to hereinafter as compound (VIII) or as N-(4-(1-(4-hydroxyphenyl)-1-methylethyl)phenyl)-N'-(2-ethoxyphenyl)-ethanediamide.

In various embodiments the present invention also includes oxamate-comprising monohydric phenols of formula (IX):

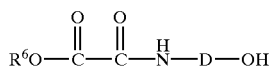
(IX)

wherein D is a divalent aromatic radical with the same definition and scope as defined hereinabove and $R^6$ is a monovalent hydrocarbon group such as alkyl, aryl, aralkyl, alkaryl, or cycloalkyl, which may be optionally substituted with an electron-withdrawing group including, but not limited to, halogen, chloro, fluoro, nitro, carboxy, trihaloacetyl, and trifluoroacetyl. Illustrative examples for $R^6$ include, but are not limited to, phenyl, methyl salicyl, 2-chlorophenyl, 2-nitrophenyl, 2-trifluoroacetylphenyl, 2-fluorophenyl, ethyl, butyl, chloroethyl, and trifluoroethyl. In particular embodiments D is a residue derived from the compound 2-(4-aminophenyl)-2-(4'-hydroxyphenyl)propane and $R^6$ is ethyl, butyl, or trifluoroethyl.

Methods of making oxanilide-comprising compounds of the present invention include those methods known in the art. In one embodiment at least one aromatic amine is contacted with a difunctional oxalic acid derivative under reactive conditions. Aromatic amines suitable for making oxanilide-comprising dihydric phenols of formula (II) include, but are not limited to, those with the structure $H_2N$—D—OH and $H_2N$—$D^1$—OH, wherein D and $D^1$ have the definition and scope given hereinabove. Aromatic amines suitable for making oxanilide-comprising monohydric phenols of formula (VI) include, but are not limited to, those with the structure $H_2N$—D—$R^5$ and $H_2N$—$D^1$—OH, wherein D, $D^1$, and $R^5$ have the definition and scope given hereinabove. Representative examples of aromatic amines include, but are not limited to, aniline, phenetidine, 3-aminophenol, 4-aminophenol, and 2-(4-aminophenyl)-2-(4'-hydroxyphenyl)propane. Suitable difunctional oxalic acid derivatives include, but are not limited to, oxalic acid, oxalyl chloride, oxalic acid diesters and oxalic acid monoester-monoacid chlorides. In particular embodiments suitable difunctional oxalic acid derivatives include, but are not limited to, oxalic acid diaryl esters and dialkyl esters, such as diethyl oxalate and dibutyl oxalate, and oxalic acid monoalkylester-monoacid chlorides, such as ethyl oxalyl chloride. Catalysts, such as a Lewis acids, are known in the art to enhance the reaction rate of an aromatic amine in reaction with a difunctional oxalic acid derivative, and a catalyst may optionally be present in any reaction to prepare oxanilide-comprising compounds.

In one embodiment two equivalents of a single aromatic amine may react in one or more steps with a difunctional oxalic acid derivative to provide a symmetrical oxanilide-comprising compound. In another embodiment one equivalent each of two different aromatic amines may react in separate steps with a difunctional oxalic acid derivative to provide an unsymmetrical oxanilide-comprising compound. In another embodiment one equivalent of an aromatic amine may react with a difunctional oxalic acid derivative to provide an unsymmetrical oxamate-comprising compound. In a particular embodiment two equivalents of a single aromatic amine react in one or more steps with a difunctional oxalic acid derivative to provide a symmetrical oxanilide-comprising dihydric phenol. In another particular embodiment one equivalent each of two different aromatic amines may react in separate steps with a difunctional oxalic acid derivative to provide either an unsymmetrical oxanilide-comprising dihydric phenol or an oxanilide-comprising monohydric phenol (for example, if only one of the aromatic amines bears a hydroxy group). In another particular embodiment one equivalent of an aromatic amine may react with a difunctional oxalic acid derivative to provide an oxamate-comprising monohydric phenol.

The synthesis of symmetrical oxanilide-comprising dihydric phenols by reaction of aromatic amines with dialkyl oxalate under the conditions taught in U.S. Pat. No. 5,847,196 gives dark-colored compounds unsuitable for use in making essentially colorless, transparent polycarbonates. In contrast, the present inventors have unexpectedly discovered that the reaction of aromatic amines with oxalate diesters bearing either aryl groups, including, but not limited to, phenyl, methyl salicyl, 2-chlorophenyl, 2-nitrophenyl, 2-trifluoroacetylphenyl, 2-fluorophenyl; or alkyl groups substituted with electron-withdrawing groups, including, but not limited to, fluoro or chloro, may be performed at lower temperature and provides both symmetrical and unsymmetrical dihydric and monohydric oxanilide-comprising phenols with little or no color, which can be used to prepare essentially colorless, transparent polycarbonates. Although the invention is not dependent upon any theory of operation, it is believed that the use of a lower temperature in the synthesis of oxanilide-comprising phenols may be a factor in decreasing color formation. Thus, in one embodiment the present invention is a method for making symmetrical oxanilide-comprising dihydric phenols which comprises the step of contacting an aromatic amine bearing a hydroxy group with a diaryl oxalate or a dialkyl oxalate bearing alkyl groups each substituted with at least one electron-withdrawing group. In another embodiment the present invention is a method for making unsymmetrical oxanilide-comprising dihydric phenols which comprises the steps of contacting an aromatic amine bearing a hydroxy group with a diaryl oxalate or a dialkyl oxalate bearing alkyl groups each substituted with at least one electron-withdrawing group, followed by contacting the oxamate intermediate with a second aromatic amine bearing a hydroxy group and different from said first aromatic amine. In still another embodiment the present invention is a method for making oxanilide-comprising monohydric phenols which comprises the steps of contacting an aromatic amine with a diaryl oxalate or a dialkyl oxalate bearing alkyl groups each substituted with at least one electron-withdrawing group, followed by contacting the oxamate intermediate with a second aromatic amine different from said first aromatic amine, wherein only one aromatic amine bears a hydroxy group. In still another embodiment the present invention is a method for making oxamate-comprising monohydric phenols which comprises the step of contacting an aromatic amine bearing a hydroxy group with a diaryl oxalate or a dialkyl oxalate bearing alkyl groups each substituted with at least one electron-withdrawing group.

In one embodiment the temperature of reaction for contacting an aromatic amine with a diaryl oxalate or a dialkyl oxalate bearing alkyl groups each substituted with at least one electron-withdrawing group is in a range of between about 30° C. and about 150° C.; in another embodiment in a range of between about 30° C. and about 100° C.; and in still another embodiment in a range of between about 30° C. and about 75° C. These same temperature ranges also apply when contacting an aromatic amine with an oxamate intermediate. Illustrative diaryl oxalates include, but are not limited to, diphenyl oxalate, bis(2-chlorophenyl)oxalate, bis(2-nitrophenyl)oxalate), and bis(2-fluorophenyl)oxalate). Illustrative dialkyl oxalates bearing alkyl groups each substituted with at least one electron-withdrawing group include, but are not limited to, bis(trifluoroethyl)oxalate and bis(chloroethyl)oxalate.

In another embodiment the present invention comprises polycarbonates which comprise oxanilide-comprising structural units. In a particular embodiment polycarbonates of the present invention comprise structural units derived from at least one oxanilide-comprising compound, at least one dihydric phenol and a carbonate precursor. Polycarbonates comprising oxanilide structural units may be made by any known method. Representative methods include, but are not limited to, solution methods, interfacial methods, melt methods, transesterification methods, solid-state methods, and redistribution methods, and combinations thereof. In one embodiment polycarbonates comprising oxanilide structural units may be made through combining at least one compound comprising at least one oxanilide moiety with at least one dihydric phenol and a carbonate precursor under reactive conditions.

Suitable dihydric phenols for preparing polycarbonates include those represented by the formula X:

wherein D is a divalent aromatic radical. In various embodiments D has the structure of formula (III);

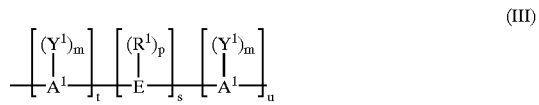

wherein $A^1$, $Y^1$, E, $R^1$, m, p, t, s, and u have the same definition and scope as defined hereinabove.

Some illustrative, non-limiting examples of dihydric phenols of formula (X) include the dihydroxy-substituted aromatic hydrocarbons disclosed by name or formula (generic or specific) in U.S. Pat. No. 4,217,438. In various embodiments of the invention dihydric phenols include 6-hydroxy-1-(4'-hydroxyphenyl)-1,3,3-trimethylindane, 4,4'-(3,3,5-trimethylcyclohexylidene)diphenol; 1,1-bis(4-hydroxy-3-methylphenyl)cyclohexane; 2,2-bis(4-hydroxyphenyl) propane (commonly known as bisphenol-A); 2,2-bis(4-hydroxy-3,5-dimethylphenyl)propane; 2,2-bis(4-hydroxy-3-methylphenyl)propane; 2,2-bis(4-hydroxy-3-ethylphenyl) propane; 2,2-bis(4-hydroxy-3-isopropylphenyl)propane; 2,4'-dihydroxydiphenylmethane; bis(2-hydroxyphenyl) methane; bis(4-hydroxy-phenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(3-phenyl-4-hydroxyphenyl)-propane; bis(4-hydroxyphenyl) cyclohexylmethane; 2,2-bis(4-hydroxyphenyl)-1-phenylpropane; hydroquinone, resorcinol; $C_{1-3}$ alkyl-substituted resorcinols.

Suitable dihydric phenols also include those containing indane structural units such as represented by the formula (XI), which compound is 3-(4-hydroxyphenyl)-1,1,3-trinmethylindan-5ol, and by the formula (XII), which compound is 1-(4-hydroxyphenyl)-1,3,3-trimethylindan-5-ol:

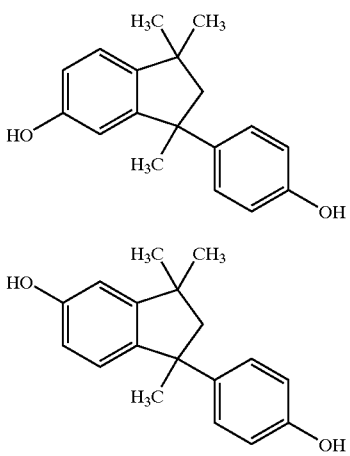

(XI)

(XII)

Suitable dihydric phenols also include those containing spirobiindane structural units such as represented by the formula (XIII):

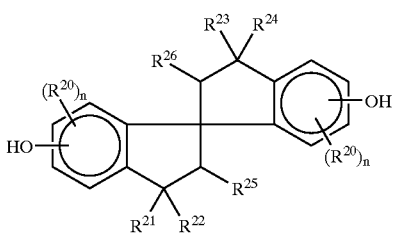

(XIII)

wherein each $R^{20}$ is independently selected from monovalent hydrocarbon radicals and halogen radicals; each $R^{21}$, $R^{22}$, $R^{23}$, and $R^{24}$ is independently $C_{1-6}$ alkyl; each $R^{25}$ and $R^{26}$ is independently H or $C_{1-6}$ alkyl; and each n is independently selected from positive integers having a value of from 0 to 3 inclusive. The monovalent hydrocarbon radicals represented by $R^{20}$ include alkyl radicals, cycloalkyl radicals, aryl radicals, aralkyl radicals, and alkaryl radicals, as already defined hereinabove. In various embodiments the halogen radicals represented by $R^{20}$ are fluorine, chlorine and bromine. In the dihydric phenol compound of formula (XIII) when more than one $R^{20}$ substituent is present they may be the same or different. The relative positions of the hydroxyl groups and $R^{20}$ on the aromatic nuclear residues may be varied in the ortho or meta positions. The position of each hydroxy group is independently at any unsubstituted site on each of the aromatic rings. In one embodiment each hydroxy group is independently in positions 5 or 6 and 5' or 6' of each aromatic ring. In another embodiment each hydroxy group is in position 6 and 6' of each aromatic ring.

In various embodiments, each $R^{20}$ is independently selected from chlorine, bromine, and lower alkyl radicals containing from 1 to about 5 carbon atoms, each $R^{21}$, $R^{22}$, $R^{23}$, and $R^{24}$ is independently $C_{1-6}$ alkyl; each $R^{25}$ and $R^{26}$ is independently H or $C_{1-6}$ alkyl; and each n is independently 0 to 3. In some embodiments, each $R^{20}$ is independently selected from chlorine and lower alkyl radicals containing from 1 to about 3 carbon atoms, each $R^{21}$, $R^{22}$, $R^{23}$, and $R^{24}$ is independently $C_{1-2}$ alkyl; each $R^{25}$ and $R^{26}$ is independently H or $C_{1-2}$ alkyl; and each n is independently 0 to 2. In other embodiments, each $R^{21}$, $R^{22}$, $R^{23}$, and $R^{24}$ is methyl; each $R^{25}$ and $R^{26}$ is H; and each n is 0.

In one embodiment a spiro dihydric phenol for forming polycarbonates suitable for use in the present invention is 6,6'-dihydroxy-3,3,3',3'-tetramethyl-1,1'-spirobiindane (sometimes know as "SBI"), in which n in formula (XIII) is 0 and the linkages with the rest of the polymer molecule are in a specific position on the aromatic rings.

In various embodiments the carbonate precursor for preparing polycarbonates include at least one carbonyl halide, carbonate ester or haloformate. The carbonyl halides which can be employed herein are carbonyl chloride, carbonyl bromide and mixtures thereof. Typical carbonate esters which may be employed herein include, but are not limited to, diaryl carbonates, including, but not limited to, diphenylcarbonate, di(halophenyl)carbonates, di(chlorophenyl)carbonate, di(bromophenyl)carbonate, di(trichlorophenyl)carbonate, di(tribromophenyl)carbonate; di(alkylphenyl)carbonates, di(tolyl)carbonate; di(naphthyl)carbonate, di(chloronaphthyl)carbonate, phenyl tolyl carbonate, chlorophenyl chloronaphthyl carbonate, di(methyl salicyl)carbonate, and mixtures thereof. The haloformates suitable for use herein include bishaloformates of dihydric phenols, which include, but are not limited to, bischloroformates of hydroquinone, bisphenol-A, 6-hydroxy-1-(4'-hydroxyphenyl)-1,3,3-trimethylindane, 4,4'-(3,3,5-trimethylcyclohexylidene)diphenol; 1,1-bis(4-hydroxy-3-methylphenyl)cyclohexane, and the like; bischloroformate-terminated polycarbonate oligomers such as oligomers comprising hydroquinone, bisphenol-A, 6-hydroxy-1-(4'-hydroxyphenyl)-1,3,3-trimethylindane, 4,4'-(3,3,5-trimethylcyclohexylidene)diphenol, 1,1-bis(4-hydroxy-3-methylphenyl)cyclohexane, or the like; and bishaloformates of glycols including, but not limited to, bishaloformates of ethylene glycol, neopentyl glycol, and polyethylene glycol. Mixtures of haloformates may be employed. In a particular embodiment carbonyl chloride, also known as phosgene, is employed.

In one embodiment polycarbonates of the present invention comprise oxanilide structural units distributed within a polycarbonate chain. In a particular embodiment the components of a polycarbonate synthesis reaction comprise at least one dihydric phenol comprising at least one oxanilide moiety and at least one dihydric phenol not containing an oxanilide moiety, the latter being described for example in formulas (X), (XI), (XII), and (XIII). In various embodiments the components for preparation of polycarbonates comprising oxanilide structural units include one dihydric phenol as described above in combination with an oxanilide-comprising dihydric phenol, or mixtures of two or more different dihydric phenols in combination with an oxanilide-comprising dihydric phenol. In a particular embodiment a dihydric phenol of formula (X) is used alone in combination with an oxanilide-comprising dihydric phenol and is 2,2-bis(4-hydroxyphenyl)propane (bisphenol-A or "BPA"), in which D in formula (III) is bis(4-phenyl)isopropylidene. In other embodiments particular mixtures comprising two or more dihydric phenols used in combination with an oxanilide-comprising dihydric phenol are a mixture comprising bisphenol-A and 1,1-bis(4-hydroxy-3-methylphenyl)cyclohexane, and a mixture comprising bisphenol-A and 6,6'-dihydroxy-3,3,3',3'- tetramethyl-1,1'-spirobiindane.

Reactive conditions for preparing polycarbonates of the invention include, but are not limited to, solution processes, interfacial processes, melt processes, transesterification processes, solid-state processes, and redistribution processes, and combinations thereof. Solution processes may comprise a stoichiometric amount of base such as triethylamine or pyridine. If an interfacial process is used, the addition of various phase transfer catalysts is optional. Phase transfer catalysts which are suitable include, but are not limited, to tertiary amines, such as triethylamine, ammonium salts, such as tetrabutylammonium bromide; or hexaethylguanidinium chloride.

In one embodiment the polycarbonates as described are prepared by a melt or transesterification process. This process does not require the use of phosgene or a solvent, and minimizes the formation of low molecular weight contaminants, such as cyclic and linear low molecular weight oligomers in the final polymer. The monomers are typically mixed with a carbonate source, such as a diarylcarbonate, and a small amount of catalyst, such as an alkali metal hydroxide or ammonium hydroxide, and heated under a vacuum according to a protocol in which the temperature is raised through a series of stages while the pressure in the headspace over the reaction mixture is lowered from ambient pressure to about 1 Torr. The time of the stages and the temperature are such that mechanical losses of material through foaming and the like are avoided. Phenol and excess diphenyl carbonate may be removed overhead to complete the polymerization process. The product high polymer may then be isolated as a melt which may be compounded with other additives, such as stabilizers and mold release agents prior to pelletization. Suitable carbonate sources, catalysts and reaction conditions may be found, for example, in U.S. Pat. No. 5,880,248, and *Kirk-Othmer Encyclopedia of Chemical Technology*, Fourth Edition, Volume 19, pp. 585–600, herein incorporated by reference.

In various embodiments polycarbonates of the invention have a weight average molecular weight in a range of between about 5,000 and about 100,000, in other embodiments a weight average molecular weight in a range of between about 10,000 and about 65,000, and in still other embodiments a weight average molecular weight in a range of between about 18,000 and about 55,000 as measured by gel permeation chromatography versus polystyrene standards. In other embodiments polycarbonates of the invention have a weight average molecular weight in a range of between about 40,000 and about 55,000, as measured by gel permeation chromatography versus polystyrene standards.

The amount of polycarbonate structural units derived from oxanilide-comprising dihydric phenol will vary in accordance with the expected end-use application of the polycarbonate resins. In various embodiments, the amount of polycarbonate structural units derived from oxanilide-comprising dihydric phenol may be in a range of between about 0.1 mole percent and about 80 mole percent, in other embodiments in a range of between about 0.5 mole percent and about 50 mole percent, in other embodiments in a range of between about 1 mole percent and about 30 mole percent, in other embodiments in a range of between about 1 mole percent and about 20 mole percent, and in still other embodiments in a range of between about 1 mole percent and about 10 mole percent, based on the total amount of structural units derived from dihydric phenol (which includes those derived from both oxanilide-comprising dihydric phenol and dihydric phenol not containing oxanilide moiety). These amounts of structural units derived from oxanilide-comprising dihydric phenol are applicable no matter whether a polycarbonate comprises structural units derived from a single dihydric phenol not containing an oxanilide moiety or a mixture comprising two or more dihydric phenols not containing an oxanilide moiety.

In any process for preparing a polycarbonate a molecular weight regulator (also known as a chain termination agent or a chain stopper) may be added, if so desired, to phenolic reactants, for example, prior to or during contacting the reactants with a carbonate precursor. Polycarbonates prepared in the presence of chain-termination agents comprise structural units derived from said chain-termination agents. Useful chain termination agents include, but are not limited to, monohydric phenols such as phenol, chroman-I, para-tertiary-butylphenol, isooctylphenol, isononylphenol, p-cumylphenol, and the like. In various embodiments structural units derived from chain termination agents are present at a level in a range of between about 0.1 mole percent and about 10 mole percent, in other embodiments in a range of between about 1 mole percent and about 10 mole percent, in other embodiments in a range of between about 4 mole percent and about 10 mole percent, and in still other embodiments in a range of between about 4 mole percent and about 7 mole percent based on the total amount of structural units derived from dihydric phenol. Techniques for the applying one or more chain termination agents are well known in the art and may be used in the any relevant process for controlling the molecular weight of a polycarbonate resin.

In one embodiment polycarbonates of the present invention comprise at least one oxanilide structural unit or oxamate structural unit attached to at least one terminal point on a polycarbonate chain. In a particular embodiment an oxanilide structural unit attached to at least one terminal point on a polycarbonate chain may be derived from an oxanilide-comprising dihydric phenol. In another particular embodiment an oxanilide structural unit or oxamate structural unit attached to at least one terminal point on a polycarbonate chain may be derived from an oxanilide-comprising monohydric phenol or oxamate-comprising monohydric phenol. In this latter embodiment the components of a polycarbonate synthesis reaction may comprise at least one monohydric phenol comprising at least one oxanilide moiety included as a chain-termination agent or at least one monohydric phenol comprising at least one oxamate moiety included as a chain-termination agent. Mixtures of oxanilide-comprising monohydric phenol and oxamate-comprising monohydric phenol may also be employed as chain-termination agents.

Monohydric phenols comprising at least one oxanilide moiety or at least one oxamate moiety include those of formula (VI) and those of formula (IX), respectively. Said oxanilide-comprising monohydric phenol or oxamate-comprising monohydric phenol or a mixture thereof may comprise all or at least a portion of the amount of any chain termination agent added to a polycarbonate synthesis reaction, and subsequently present as structural units in a product polycarbonate. In one embodiment essentially all chain termination agent added to a polycarbonate synthesis reaction comprises an oxanilide moiety or an oxamate moiety or a mixture thereof. In various embodiments, the amount of polycarbonate structural units derived from oxanilide-comprising monohydric phenol or oxamate-comprising monohydric phenol (or a mixture thereof) may be in a range of from 0 mole percent to about 100 mole percent, in other embodiments in a range of from about 1 mole percent and about 100 mole percent, in other embodiments in a range of from about 1 mole percent and about 90 mole percent, in other embodiments in a range of from about 10 mole percent and about 80 mole percent, in other embodiments in a range of from about 20 mole percent and about 70 mole percent, and in still other embodiments in a range of from about 30 mole percent and about 60 mole percent, based on the total amount of structural units derived from monohydric phenol (which includes those derived from both oxanilide- and oxamate-comprising monohydric phenol, and any monohydric phenol not containing an oxanilide or an oxamate moiety).

All or at least a portion of polycarbonate chains may have at least one oxanilide or oxamate structural unit (or a mixture comprising both structural units) attached to at least one terminal point. In one embodiment essentially all of the polycarbonate chains have at least one oxanilide or oxamate structural unit attached to two terminal points on chains. In another embodiment a branching agent is included in a polycarbonate synthesis reaction and essentially all of the polycarbonate chains have at least one oxanilide or oxamate structural unit attached at a terminal point. Those skilled in the art will recognize that variation in the number of chain ends with at least one oxanilide or oxamate structural unit attached and variation in the types of chain ends (for example, linear or branched) may occur without departing from the scope of the present invention.

In still another embodiment polycarbonates of the present invention comprise oxanilide structural units distributed within a polycarbonate chain and at least one oxanilide or oxamate structural unit attached to at least one terminal point on a polycarbonate chain. In a particular embodiment the components of a polycarbonate synthesis reaction comprise at least one dihydric phenol comprising at least one oxanilide moiety and at least one monohydric phenol comprising at least one oxanilide or oxamate moiety. Illustrative oxanilide-comprising dihydric phenols and oxanilide- or oxamate-comprising monohydric phenols include those described hereinabove. The amount of oxanilide-comprising dihydric phenol in relation to the total amount of dihydric phenol present and the amount of oxanilide- or oxamate-comprising monohydric phenol in relation to the total amount of monohydric phenol present are in the ranges described hereinabove.

Articles comprising a polycarbonate comprising oxanilide structural units (or oxamate structural units) are another embodiment of the present invention. In various embodiments articles may consist essentially of polycarbonates comprising oxanilide structural units (or oxamate structural units), for example in admixture with polycarbonate additives known in the art, such as conventional UV screeners. In other embodiments articles of the present invention are multilayer articles comprising two or more layers, typically in contiguous superposed contact with one another. In various embodiments multilayer articles comprise a substrate layer comprising at least one thermoplastic polymer, thermoset polymer, cellulosic material, glass, ceramic, or metal, and at least one coating layer thereon, said coating layer comprising an oxanilide-comprising polycarbonate. Optionally, the multilayer articles may further comprise an interlayer, for example an adhesive interlayer (or tie layer), between any substrate layer and any coating layer comprising an oxanilide-comprising polycarbonate. Multilayer articles of the invention include, but are not limited to, those which comprise a substrate layer and a coating layer comprising an oxanilide-comprising polycarbonate; those which comprise a substrate layer with a coating layer comprising said polycarbonate on each side of said substrate layer; and those which comprise a substrate layer and at least one coating layer comprising an oxanilide-comprising polycarbonate with at least one interlayer between a substrate layer and a coating layer. Any interlayer may be transparent and/or may contain an additive, for example a colorant or decorative material such as metal flake. If desired, an overlayer may be included over the coating layer comprising an oxanilide-comprising polycarbonate, for example to provide abrasion or scratch resistance. In one embodiment the substrate layer, coating layer comprising an oxanilide-comprising polycarbonate, and any interlayers or overcoating layers are in contiguous superposed contact with one another. In any embodiment an oxanilide- or oxamate-comprising polycarbonate layer may comprise conventional additives known in the art for use with polycarbonate, including conventional UV screeners, heat stabilizers, flow promoters, lubricants, dyes, pigments, and the like.

Representative multilayer articles which can be made which comprise compositions of the invention include aircraft, automotive, truck, military vehicle (including automotive, aircraft, and water-borne vehicles), and motorcycle exterior and interior components, including panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; optical lenses; ophthalmic lenses; corrective ophthalmic lenses; implantable ophthalmic lenses; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming.

Without further elaboration, it is believed that one skilled in the art can, using the description herein, utilize the present invention to its fullest extent. The following examples are included to provide additional guidance to those skilled in the art in practicing the claimed invention. While some of the examples are illustrative of various embodiments of the claimed invention, others are comparative. The examples provided are merely representative of the work that contributes to the teaching of the present application. Accordingly, these examples are not intended to limit the invention, as defined in the appended claims, in any manner.

Unless otherwise specified, solvents and reagents were dried by refluxing over calcium hydride. Glass transition temperatures (Tg) were determined by differential scanning calorimetry (DSC) in air at a heating rate of 20° C./minute. Molecular weights were determined by gel permeation chromatography (GPC) vs. polystyrene standards.

EXAMPLE 1

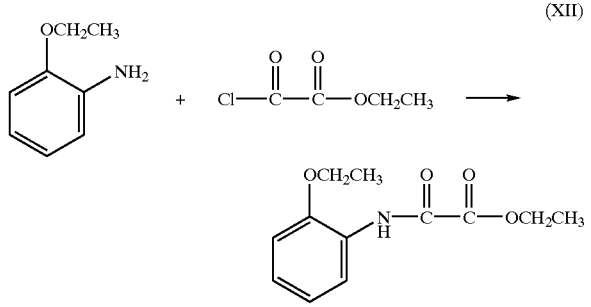

Synthesis of Compound (XII): To a cold (0° C.) solution of freshly distilled o-phenetidine (2.61 milliliters [ml], 20 millimoles [mmol]) in dry dichloromethane (50 ml) was added dry triethylamine (4.2 ml, 30 mmol) followed by a dropwise addition of ethyl oxalyl chloride (2.25 ml, 20.4 mmol) over about 10 minutes. The reaction was allowed to warm to room temperature and stirred for one hour. Thin layer chromatographic analysis (TLC) using hexanes/ethyl acetate indicated complete conversion of starting material. The reaction mixture was washed twice with 1 N hydrochloric acid, twice with water and dried over anhydrous sodium sulfate. The solvent was removed under reduced pressure to give the oxamate, compound (XII), greater than 99% pure by high performance liquid chromatography (HPLC), as light yellow crystals with GC-MS: m/e 237.2 (M+).

EXAMPLE 2

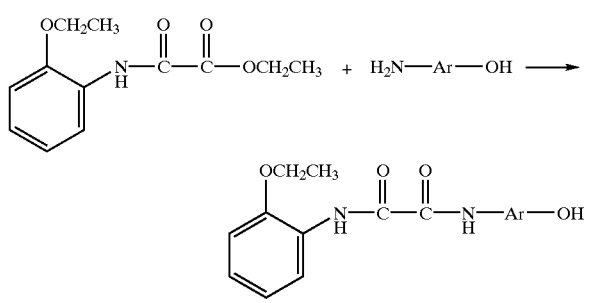

Synthesis of Compound (VI); Ar=2,2-(4,4'-phenylene)propyl (also known as compound (VIII)): A mixture of oxamate, compound (XII), (2.415 g, 10.18 mmol) and 2-(4-aminophenyl)-2-(4'-hydroxyphenyl)propane (2.545 g, 11.2 mmol) were suspended in o-dichlorobenzene (10 ml), degassed, and heated to reflux for 20 hrs. TLC indicated complete conversion of the oxamate. The crude reaction mixture was concentrated under reduced pressure, taken up in dichloromethane, and filtered through a plug of silica gel. The product was recrystallized from hexanes/dichloromethane and again filtered through silica gel, yielding the desired oxanilide as white fine crystals.

EXAMPLE 3

Synthesis of Compound (VI); Ar=4-phenylene : To a 25 ml flask were added oxamate, compound (XII), (4.65 g, 19.6 mmol), purified p-aminophenol (3 g, 27.5 mmol), o-dichlorobenzene (12 ml) and N,N-dimethylacetamide (2 ml). The contents of the flask were degassed with a stream of nitrogen, then heated to 150° C. for 10 hrs. TLC indicated complete conversion of the oxamate. The reaction mixture was concentrated under reduced pressure. Excess p-aminophenol was removed by triturating with ethyl acetate and the remaining brown powder was recrystallized from ethyl acetate/methanol to give the crude product as a light brown powder.

EXAMPLE 4

Synthesis of bis(trifluoroethyl)oxalate: To a dry flask equipped with mechanical stirrer, pressure equalizing addition funnel and reflux condenser, was added dry diethylether (250 ml), trifluoroethanol (69.2 ml, 0.95 mol) and dry pyridine (114 ml, 1.41 mol). To the cold (0° C.) mixture was added oxalyl chloride, dropwise (41 ml, 0.47 mol). The contents of the flask were then stirred at room temperature for 30 minutes, and the thick slurry was filtered, and washed with diethyl ether. The filtrate was washed twice with cold 1 N hydrochloric acid, then with water, dried over anhydrous sodium sulfate, and then fractionally distilled. Upon recovering about 20 ml of trifluoroethanol and an intermediate forerun, the main fraction boiling at 159–161° C. at normal pressure was collected to provide bis(trifluoroethyl)oxalate as a colorless liquid, fuming in moist air, GC-MS m/e 254.2. GC purity 99.9+%.

EXAMPLE 5

Synthesis of oxanilide-comprising monohydric phenols: An aminophenol is combined with an excess of bis (trifluoroethyl)oxalate, optionally in a solvent such as tetrahydrofuran or ethyl acetate. The mixture is heated, for example, in an ethylene glycol bath at 71.5° C. until analysis shows essentially complete disappearance of aminophenol starting material. Excess oxalate is distilled from the mixture and the monohydric phenol product isolated and purified by conventional means.

EXAMPLE 6

General procedure for the synthesis of symmetrical oxanilide-comprising dihydric phenols: To a 50 ml flask were added an aminophenol (50 mmol), bis(trifluoroethyl) oxalate (6.355 g, 25 mmol) and either tetrahydrofuran or ethyl acetate (12 ml). The mixture was degassed using nitrogen and heated in an ethylene glycol bath at 71.5° C. for about 5–10 hours. In the case of 2-(4-aminophenyl)-2-(4'-hydroxyphenyl)propane the product was purified by recrystallization from ethyl acetate/isopropanol to provide white needles with the appropriate nuclear magnetic resonance (NMR) spectrum. HPLC analysis showed the product was about 99% pure.

COMPARATIVE EXAMPLE 6

A symmetrical oxanilide-comprising dihydric phenol was made from diethyl oxalate and 2-(4-aminophenyl)-2-(4'-hydroxyphenyl)propane using the procedure of U.S. Pat. No. 5,847,196. A dark-colored product was obtained. TLC showed impurities in the product that were not completely removed by recrystallization.

EXAMPLE 7

General procedure for the synthesis of unsymmetrical oxanilide-comprising dihydric phenols: A first aminophenol is combined with an excess of bis(trifluoroethyl)oxalate, optionally in a solvent such as tetrahydrofuran or ethyl acetate. The mixture is heated, for example, in an ethylene glycol bath at 71.5° C. until analysis shows essentially complete disappearance of aminophenol starting material. Excess oxalate is distilled from the mixture. The monohydric phenol product, optionally in a solvent such as tetrahydrofuran or ethyl acetate, is combined with a second aminophenol and the mixture is heated, for example, in an ethylene glycol bath at 71.5° C. until analysis shows essentially complete disappearance of aminophenol. The dihydric phenol product is isolated and purified by conventional means.

EXAMPLE 8

General procedure for the synthesis of phenyl chloroformate capped oxanilides: To a dry 5 ml flask was added the oxanilide-comprising monohydric or dihydric phenol (0.172 mmol), dichloromethane/THF 4/1 (vol/vol) (1.5 ml, dry) and pyridine (30 microliters, 2.1 equivalents [eq.], dry, for difunctional oxanilides or 16 microliters, 1.05 eq., dry, for monofunctional oxanilides). Phenyl chloroformate was then added (46 microliters, 2.1 eq. for difunctional oxanilides or 23 microliters, 1.05 eq. for monofunctional oxanilides) and the mixture was stirred at room temperature until colorless and disappearance of the starting material (TLC). The product was recovered by filtration through a plug of silica gel and recrystallization from ethyl acetate/hexanes.

Ultraviolet (UV) spectra for an oxanilide-comprising monohydric phenol (compound (VIII)) and an oxanilide-comprising dihydric phenol (compound (V)), both capped with phenyl chloroformate, are shown in FIG. 1. The spectra indicate no tailing into the visible region of the spectrum, good coverage of the portion of the UV spectrum most responsible for polycarbonate degradation, and quite large extinction coefficients.

EXAMPLE 9

Polycarbonate (A): An oxanilide-comprising monohydric phenol (compound (VM)) was incorporated into a polycarbonate at 5 mole %. To a 250 ml phosgenation reactor was added BPA (3.424 g, 15 mmol), oxanilide (VIII) (314 milligrams [mg], 5 mole %, 9.2 wt %), dichloromethane (50 ml), water (40 ml) and triethylamine (45 microliters, 2 mole %). Phosgene was then added (1.8 g, 1.2 eq.) at a rate of 0.25 g/min and the polymer solution was worked up by separating the aqueous and organic layers, washing the organic phase twice with dilute hydrochloric acid and twice with water, followed by precipitation into hot water to provide a colorless, transparent polymer with Mw 35,000, Mw/Mn 2.3, Tg 148° C.

EXAMPLE 10

Polycarbonate (B): An oxanilide-comprising dihydric phenol (compound (V)) made by the method of the present invention was incorporated into a polycarbonate at 20 mole %. To a 250 ml phosgenation reactor was added BPA (2.740 g, 12 mmol), oxanilide (V) (1.526 g, 3 mmol, 35.8 wt %), dichloromethane (70 ml), water (40 ml), p-cumylphenol (110 mg, 3.5 mole %) and triethylamine (45 microliters, 2 mole %). Phosgene was then added (1.8 g, 1.2 eq.) at 0.25 g/min, and the polymer solution was worked up as usual, followed by precipitation into hot water to provide a colorless, transparent polymer with Mw 42,000, Mw/Mn 2.3, Tg 153° C.

COMPARATIVE EXAMPLE 10

Polycarbonate (D): An oxanilide-comprising dihydric phenol (compound (V)) made by the method of Comparative Example 6 is incorporated into a polycarbonate at 20 mole % using the method for making Polycarbonate B. There is obtained a dark-colored polymer.

EXAMPLE 11

Polycarbonate (C) An oxanilide-comprising dihydric phenol (compound (V)) made by the method of the present invention was incorporated into a polycarbonate at 50 mole %. To a 250 ml phosgenation reactor was added BPA (1.141 g, 5 mmol), oxanilide (V) (2.543 g, 5 mmol, 69 wt %), dichloromethane (70 ml), water (40 ml), p-cumylphenol (74 mg, 3.5 mole %) and triethylamine (45 microliters, 2 mole %). Phosgene was then added (1.2 g, 1.2 eq.) at 0.25 g/min, and the polymer solution was worked up as usual, followed by precipitation into hot water to provide a colorless, transparent polymer with Mw 42,000, Mw/Mn 2.3, Tg 155° C.

Multilayer articles comprising a coating layer of either polycarbonate (A) comprising oxanilide structural units as terminal groups or polycarbonates (B) or (C) comprising oxanilide structural units distributed within a polycarbonate chain were prepared using a substrate comprising a bisphenol-A polycarbonate. In particular bisphenol-A polycarbonate substrate plaques containing 2 wt. % titanium dioxide were coated with a layer about 30 mils thick of oxanilide-comprising polycarbonate A, B, or C by compression molding. The articles were subjected to accelerated weathering in an Atlas Ci35a xenon arc weatherometer equipped with borosilicate inner and outer filters at an irradiance of 0.77 watts per meter squared ($W/m^2$) at 340 nanometers (nm). The temperatures were: black panel 70° C., dry bulb 45° C., wet bulb depression 10° C. The cycle was 160 minutes (min) light followed by 5 min dark and 15 min dark with water spray. Samples were evaluated for color on a MacBeth ColorEye 7000A colorimeter with results reported as $\Delta E^*$ ($\Delta E=(\Delta L^2+\Delta a^2+\Delta b^2)^{0.5}$). Color was measured in reflectance mode. Gloss (60°) was measured on a Byk Gardner Micro Trigloss gloss meter. Yellowing index (YI) was measured according to ASTM D1925.

Figure 2:
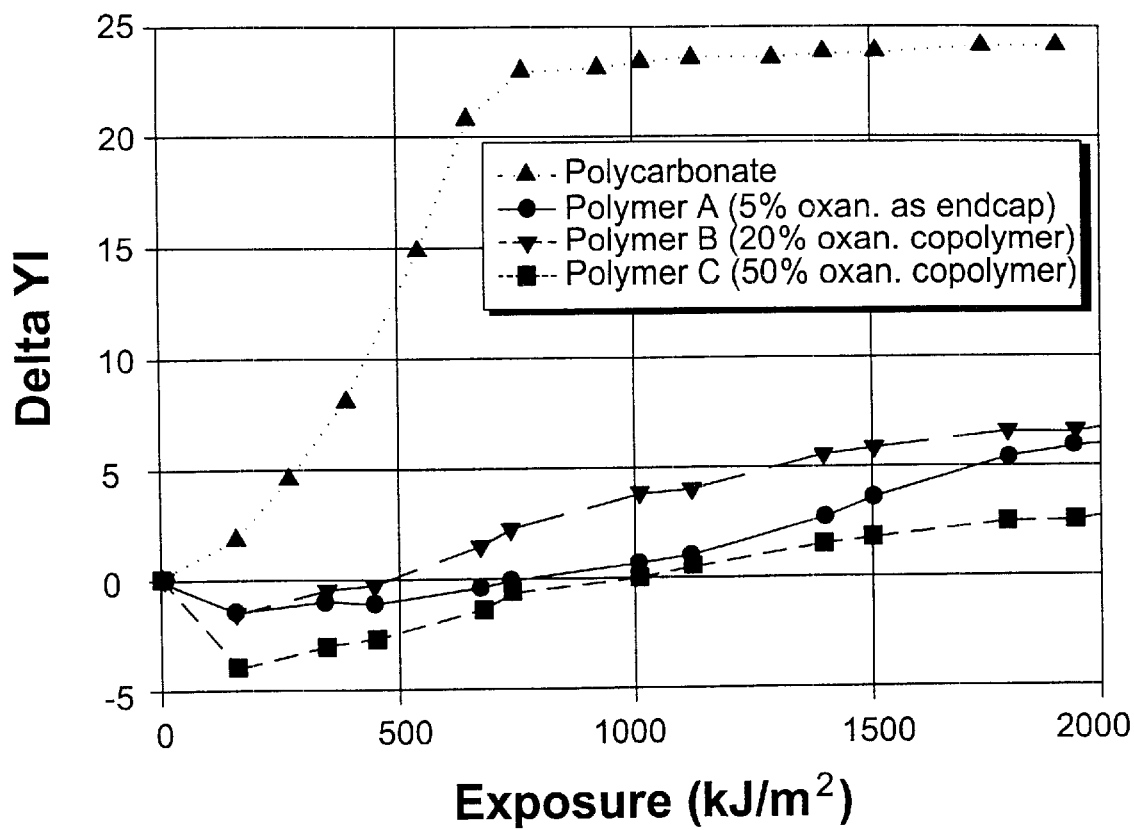
FIG. 2 shows change in yellowing index (delta YI) upon exposure to ultraviolet radiation for plaques of bisphenol-A polycarbonate compared to plaques comprising bisphenol-A polycarbonate with an overlayer of polycarbonate comprising bisphenol-A and oxanilide structural units.
Figure 3:
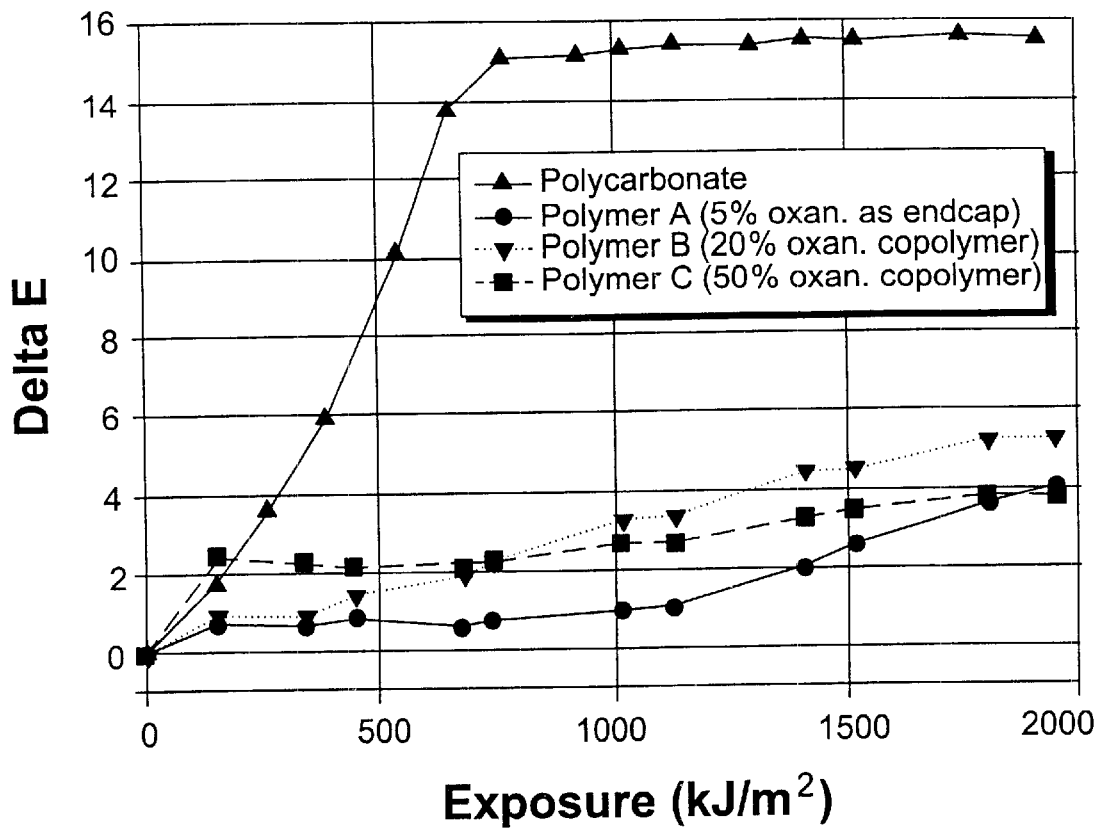
FIG. 3 shows change in color (delta E) upon exposure to ultraviolet radiation for plaques of bisphenol-A polycarbonate compared to plaques comprising bisphenol-A polycarbonate with an overlayer of polycarbonate comprising bisphenol-A and oxanilide structural units.

FIG. 2 shows the change in yellowing index (delta YI) upon exposure to ultraviolet radiation and FIG. 3 shows the change in color (delta E) upon exposure to ultraviolet radiation for plaques of bisphenol-A polycarbonate compared to plaques comprising bisphenol-A polycarbonate with an overlayer of polycarbonate comprising bisphenol-A and oxanilide structural units (Polycarbonates A, B, and C). The results indicate that, after 2,000 hours of continuous exposure, all three sets of the plaques comprising oxanilide-comprising polycarbonates exhibit much lower yellowing and color shift than bisphenol-A polycarbonate control plaques. It is significant that plaques comprising polycarbonate A (comprising oxanilide structural units as terminal groups) shows good IW stabilization of polycarbonate substrate even though oxanilide moieties are present at only limited loading.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All U.S. Patents cited herein are incorporated herein by reference.

What is claimed is:

1. A polycarbonate comprising structural units derived from at least one first dihydric phenol, a carbonate precursor, and at least one oxanilide-comprising dihydric phenol, or a mixture of an oxanilide-comprising dihydric phenol and an oxamate-comprising compound, wherein the oxanilide-comprising dihydric phenol has the structure of formula (II):

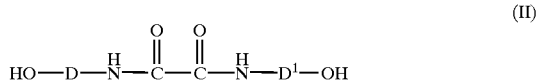

(II)

wherein D and $D^1$ are each independently a divalent aromatic radical with the structure of formula (III):

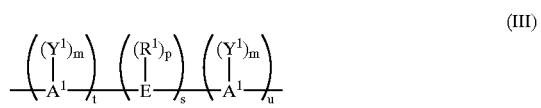

(III)

wherein $A^1$ is an aromatic group; E is at least one cycloaliphatic group; a sulfur-containing linkage; a phosphorus-containing linkage; an ether linkage; a carbonyl group; a tertiary nitrogen group; or a silicon-containing linkage; $R^1$ is hydrogen or a monovalent hydrocarbon group; $Y^1$ is selected from the group consisting of a monovalent hydrocarbon group, halogen, bromine, chlorine; nitro; and $OR^2$, wherein $R^2$ is a monovalent hydrocarbon group; "m" represents any integer from and including zero through the number of positions on $A^1$ available for substitution; "p" represents an integer from and including zero through the number of positions on E available for substitution; "t" represents an integer equal to at least one, "s" is either zero or one; and "u" represents any integer including zero.

2. The polycarbonate of claim 1 wherein the first dihydric phenol has the structure HO—D—OH, wherein D is a divalent aromatic radical with the structure of formula (II):

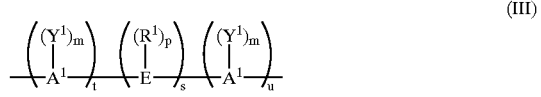

(III)

wherein $A^1$ is an aromatic group; E is at least one alkylene, alkylidene, or cycloaliphatic group; a sulfur-containing linkage; a phosphorus-containing linkage; an ether linkage; a carbonyl group; a tertiary nitrogen group; or a silicon-containing linkage; $R^1$ is hydrogen or a monovalent hydrocarbon group; $Y^1$ is selected from the group consisting of a monovalent hydrocarbon group, halogen, bromine, chlorine; nitro; and $OR^2$, wherein $R^2$ is a monovalent hydrocarbon group; "m" represents any integer from and including zero through the number of positions on $A^1$ available for substitution; "p" represents an integer from and including zero through the number of positions on E available for substitution; "t" represents an integer equal to at least one; "s" is either zero or one; and "u" represents any integer including zero.

3. The polycarbonate of claim 1 wherein the first dihydric phenol is at least one member selected from the group consisting of 2,2-bis(4-hydroxyphenyl)propane, 1,1-bis(4-hydroxy-3-methylphenyl)cyclohexane, 3-(4-hydroxyphenyl)-1,1,3-trimethylindan-5-ol, 1-(4-hydroxyphenyl)-1,3,3-trimethylindan-5-ol, and 6,6'-dihydroxy-3,3,3',3'-tetramethyl-1,1'-spirobiindane.

4. The polycarbonate of claim 1 wherein D and $D^1$ are different.

5. The polycarbonate of claim 1 wherein D and $D^1$ are the same.

6. The polycarbonate of claim 1 wherein the amount of structural units derived from oxanilide-comprising dihydric phenol is in a range of between about 0.1 mole percent and about 80 mole percent, based on the total amount of structural units derived from dihydric phenol.

7. The polycarbonate of claim 1 wherein the amount of structural units derived from oxanilide-comprising dihydric phenol is in a range of between about 0.5 mole percent and about 50 mole percent, based on the total amount of structural units derived from dihydric phenol.

8. The polycarbonate of claim 1 wherein the amount of structural units derived from oxanilide-comprising dihydric phenol is in a range of between about 1 mole percent and about 30 mole percent, based on the total amount of structural units derived from dihydric phenol.

9. The polycarbonate of claim 1 wherein the amount of structural units derived from oxanilide-comprising dihydric phenol is in a range of between about 1 mole percent and about 20 mole percent, based on the total amount of structural units derived from dihydric phenol.

10. A polycarbonate comprising structural units derived from at least one dihydric phenol, a carbonate precursor, and at least one oxanilide-comprising monohydric phenol, or a mixture of an oxanilide-comprising monohydric phenol and an oxamate-comprising compound, wherein the oxanilide-comprising monohydric phenol has the structure of formula (VI):

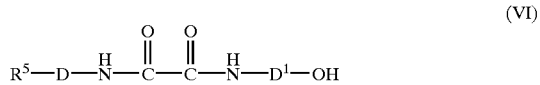

(VI)

wherein D and $D^1$ are each independently a divalent aromatic radical with the structure of formula (III):

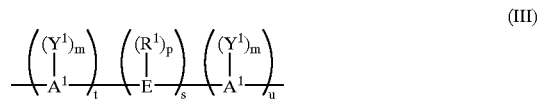

(III)

wherein $A^1$ is an aromatic group; E is at least one alkylene, alkylidene, or cycloaliphatic group; a sulfur-containing linkage; a phosphorus-containing linkage; an ether linkage; a carbonyl group; a tertiary nitrogen group; or a silicon-containing linkage; $R^1$ is hydrogen or a monovalent hydrocarbon group; $Y^1$ is selected from the group consisting of a monovalent hydrocarbon group, halogen, bromine, chlorine; nitro; and $OR^2$, wherein $R^2$ is a monovalent hydrocarbon group; "m" represents any integer from and including zero through the number of positions on $A^1$ available for substitution; "p" represents an integer from and including zero through the number of positions on E available for substitution; "t" represents an integer equal to at least one; "s" is either zero or one; "u" represents any integer including zero; and $R^5$ is selected from the group consisting of hydrogen, a monovalent hydrocarbon group; halogen, bromine, chlorine; nitro; and $OR^2$, wherein $R^2$ is a monovalent hydrocarbon group.

11. The polycarbonate of claim 10 wherein the oxanilide-comprising monohydric phenol is N-(4-(1-(4-hydroxyphenyl)-1-methylethyl)phenyl)-N'-(2-ethoxyphenyl)-ethanediamide.

12. The polycarbonate of claim 10 wherein structural units derived from oxanlide-comprising monohydric phenol are present at a level in a range of between about 0.1 mole percent and about 10 mole percent based on the total amount of structural units derived from dihydric phenol.

13. The polycarbonate of claim 10 wherein structural units derived from oxanilide-comprising monohydric phenol are in a range of between about 1 mole percent and about 100 mole percent, based on the total amount of structural units derived from chain-termination agent.

14. The polycarbonate of claim 10 wherein structural units derived from oxanilide-comprising monohydric phenol are present at a level of 100 mole percent, based on the total amount of structural units derived from chain-termination agent.

15. The polycarbonate of claim 1 wherein the oxamate-comprising compound is a monohydric phenol with the structure of formula (IX):

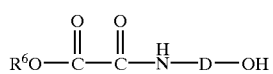

(IX)

wherein D is a divalent aromatic radical with the structure of formula (III):

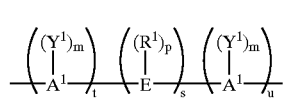

(III)

wherein $A^1$ is an aromatic group; E is at least one alkylene, alkylidene, or cycloaliphatic group, a sulfur-containing linkage; a phosphorus-containing linkage; an ether linkage; a carbonyl group; a tertiary nitrogen group; or a silicon-containing linkage; $R^1$ is hydrogen or a monovalent hydrocarbon group; $Y^1$ is selected from the group consisting of a monovalent hydrocarbon group, halogen, bromine, chlorine; nitro; and $OR^2$, wherein $R^2$ is a monovalent hydrocarbon group; "m" represents any integer from and including zero through the number of positions on $A^1$ available for substitution; "p" represents an integer from and including zero through the number of positions on E available for substitution "t" represents an integer equal to at least one; "s" is either zero or one; "t" represents any integer including zero; and $R^6$ is a monovalent hydrocarbon group, optionally substituted with an electron-withdrawing group.

16. The polycarbonate of claim 15 wherein the oxamate-comprising monohydric phenol is a compound of the formula (IX) in which D is a residue derived from 2-(4-aminophenyl)-2-(4'-hydroxyphenyl)propane and $R^6$ is trifluoroethyl.

17. The polycarbonate of claim 1 wherein the carbonate precursor is selected from the group consisting of phosgene, diaryl carbonate, and diphenyl carbonate.

18. A polycarbonate comprising structural units derived from bisphenol-A, N-(4-(1-(4-hydroxyphenyl)-1-methylethyl)phenyl)-N'-(2-ethoxyphenyl)-ethanediamide, and a carbonate precursor.

19. The polycarbonate of claim 18 comprising structural units derived from N-(4-(1-(4-hydroxyphenyl)-1-methylethyl)phenyl)-N'-(2-ethoxyphenyl)ethanediamide in an amount in a range of between about 1 mole percent and about 10 mole percent, based on the total amount of structural units derived from dihydric phenol.

20. An article comprising a polycarbonate of claim 1.
21. An article comprising a polycarbonate of claim 10.
22. An article comprising a polycarbonate of claim 11.
23. An article comprising a polycarbonate of claim 15.
24. An article comprising a polycarbonate of claim 18.

25. A method for making a polycarbonate comprising structural units derived from at least one first dihydric phenol and at least one oxanilide-comprising dihydric phenol, or a mixture of an oxanilide-comprising dihydric phenol and an oxamate-comprising compound, which comprises the step of contacting under reactive conditions at least one first dihydric phenol, a carbonate precursor, and at least one oxanilide-comprising dihydric phenol, or a mixture of an oxanilide-comprising dihydric phenol and an oxanate-comprising compound, wherein the oxanilide-comprising dihydric phenol has the structure of formula (II):

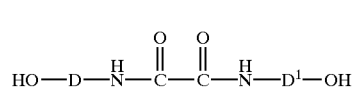

(II)

wherein D and $D^1$ are each independently a divalent aromatic radical with the structure of formula (III);

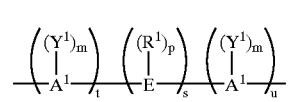

(III)

wherein $A^1$ is an aromatic group; E is at least one cycloaliphatic group; a sulfur-containing linkage; a phosphorus-containing linkage; an ether linkage; a carbonyl group; a ternary nitrogen group; or a silicon-containing linkage; $R^1$ is hydrogen or a monovalent hydrocarbon group; $Y^1$ is selected from the group consisting of a monovalent hydrocarbon group, halogen, bromine, chlorine; nitro; and $OR^2$, wherein $R^2$ is a monovalent hydrocarbon group; "m" represents any integer from and including zero through the number of positions on $A^1$ available for substitution; "p" represents an integer from and including zero through the number of positions on E available for substitution; "t" represents an integer equal to at least one; "s" is either zero or one; and "u" represents any integer including zero.

26. The method of claim 25 wherein the first dihydric phenol has the structure HO—D—OH, wherein D is a divalent aromatic radical with the structure of formula (III):

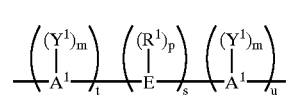

(III)

wherein $A^1$ is an aromatic group; E is at least one alkylene, alkylidene, or cycloaliphatic group; a sulfur-containing linkage; a phosphorus-containing linkage; an ether linkage; a carbonyl group; a tertiary nitrogen group; or a silicon-containing linkage; $R^1$ is hydrogen or a monovalent hydrocarbon group; $Y^1$ is selected from the group consisting of a monovalent hydrocarbon group, halogen, bromine, chlorine; nitro; and $OR^2$, wherein $R^2$ is a monovalent hydrocarbon group; "m" represents any integer from and including zero through the number of positions on $A^1$ available for substitution; "p" represents an integer from and including zero through the number of positions on E available for substitution; "t" represents an integer equal to at least one; "s" is either zero or one; and "u" represents any integer including zero.

27. The method of claim 26 wherein the first dihydric phenol is at least one member selected from the group consisting of 2,2-bis(4-hydroxyphenyl)propane, 1,1-bis(4-hydroxy-3-methylphenyl)cyclohexane, 3-(4-hydroxyphenyl)-1,1,3-trimethylindan-5-ol, 1-(4-hydroxyphenyl)-1,3,3-trimethylindan-5-ol, and 6,6'-dihydroxy-3,3,3',3-tetramethyl-1,1'-spirobiindane.

28. The method of claim 25 wherein D and $D^1$ are different.

29. The method of claim 25 wherein D and $D^1$ are the same.

30. The method of claim 25 wherein the amount of structural units derived from oxanilide-comprising dihydric phenol is in a range of between about 0.1 mole percent and about 80 mole percent, based on the total amount of structural units derived from dihydric phenol.

31. The method of claim 25 wherein the amount of structural units derived from oxanilide-comprising dihydric phenol is in a range of between about 0.5 mole percent and about 50 mole percent, based on the total amount of structural units derived from dihydric phenol.

32. The method of claim 25 wherein the amount of structural units derived from oxanilide-comprising dihydric phenol in a range of between about 1 mole percent and about 30 mole percent, based on the total amount of structural units derived from dihydric phenol.

33. The method of claim 25 wherein the amount of structural units derived from oxanilide-comprising dihydric phenol in a range of between about 1 mole percent and about 20 mole percent, based an the total amount of structural units derived from dihydric phenol.

34. A method for making a polycarbonate comprising structural units derived from at least one dihydric phenol, a carbonate precursor, and at least one oxanilide-comprising monohydric phenol, or a mixture of an oxanilide-comprising monohydric phenol and an oxamate-comprising compounds wherein the oxanilide-comprising monohydric phenol -has the structure of formula (VI):

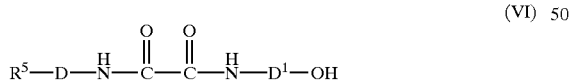

(VI)

wherein D and $D^1$ are each independently a divalent aromatic radical with the structure of formula (III):

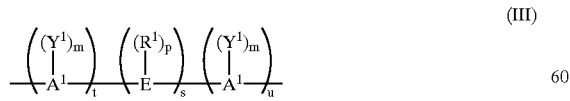

(III)

wherein $A^1$ is an aromatic group; E is at least one alkylene, alkylidene, or cycloaliphatic group; a sulfur-containing linkage; a phosphorus-containing linkage; an ether linkage; a carbonyl group; a tertiary nitrogen group; or a silicon-containing linkage; $R^1$ is hydrogen or a monovalent hydrocarbon group $Y^1$ is selected from the group consisting of a monovalent hydrocarbon group, halogen, bromine, chlorine; nitro; and $OR^2$, wherein $R^2$ is a monovalent hydrocarbon group; "m" represents any integer from and including zero through the number of positions on $A^1$ available for substitution; "p" represents an integer from and including zero through the number of positions on E available for substitution; "t" represents an integer equal to at least one; "s" is either zero or one; "u" represents any integer including zero; and $R^5$ is selected from the group consisting of hydrogen, a monovalent hydrocarbon group; halogen, bromine, chlorine; nitro, and $OR^2$, wherein $R^2$ is a monovalent hydrocarbon group.

35. The method of claim 34 wherein the oxanilide-comprising monohydric phenol is N-(4-(1-(4-hydroxyphenyl)-1-methylethyl)phenyl)-N'-(2-ethoxyphenyl)-ethanediamide.

36. The method of claim 34 wherein structural units derived from oxanilide-comprising monohydric phenol are present at a level in a range of between about 0.1 mole percent and about 10 mole percent based on the total amount of structural units derived from dihydric phenol.

37. The method of claim 34 wherein the amount of structural units derived from oxanilide-comprising monohydric phenol is in a range of between about 1 mole percent and about 100 mole percent, based on the total amount of structural units derived from chain-termination agent.

38. The method of claim 34 wherein the amount of structural units derived from oxanilide-comprising monohydric phenol is 100 mole percent, based on the total amount of structural units derived from chain-termination agent.

39. The method of claim 36 wherein the oxamate-comprising compound is a monohydric phenol with the structure of formula (IX):

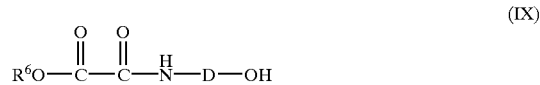

(IX)

wherein D is a divalent aromatic radical with the structure of formula (III):

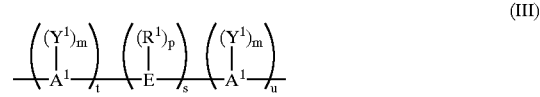

(III)

wherein $A^1$ is an aromatic group; E is at least one alkylene, alkylidene, or cycloaplihatic group; a sulfur-containing linkage; a phosphorus-containing linkage; an ether linkage; a carbonyl group; a tertiary nitrogen group; or a silicon-containing linkage; $R^1$ is hydrogen or a monovalent hydrocarbon group; $Y^1$ is selected from the group consisting of a monovalent hydrocarbon group, halogens bromine, chlorine; nitro; and $OR^2$, wherein $R^2$ is a monovalent hydrocarbon group, "m" represents any integer from and including zero through the number of positions on $A^1$ available for substitution; "p" represents an integer from and including zero through the number of positions on E available for substitution; "t" repre sents an integer equal to at least one, "s" is either zero or one; "u" represents any integer including zero; and $R^6$ is a monovalent hydrocarbon group, optionally substituted with an electron-withdrawing group.

40. The method of claim 39 wherein the oxamate-comprising monohydric phenol is a compound of the formula (IX) in which D is a residue derived from 2-(4-aminophenyl)-2-(4'-hydroxyphenyl)propane and $R^6$ is trifluoroethyl.

41. The method of claim 25 wherein the carbonate precursor is selected from the group consisting of phosgene, diaryl carbonate, and diphenyl carbonate.

42. The method of claim 25 wherein the step of contacting under reactive conditions is selected from the group consisting of a solution process, an interfacial process, a melt process, a transesterification process, a solid-state process, and a redistribution process, and combinations thereof.

43. A method for making a polycarbonate comprising oxanilide structural units which comprises the step of contacting under reactive conditions bisphenol-A, N-(4-(1-(4-hydroxyphenyl)-1-methylethyl)phenyl)-N'-(2-ethoxyphenyl)-ethanediamnide, and a carbonate precursor.

44. The method of claim 43 wherein the polycarbonate comprises structural units derived from N-(4-(1-(4-hydroxyphenyl)-1-methylethyl)phenyl)-N'-(2-ethoxyphenyl)-ethanediamide in an amount in a range of between about 1 mole percent and about 10 mole percent, based on the total amount of structural units derived from dihydric phenol.

45. The method of claim 43 wherein the step of contacting under reactive conditions is selected from the group consisting of a solution process, an interfacial process, a melt process, a transesterification process, a solid-state process, or a redistribution process, or a combination thereof.

46. An oxanilide-comprising monohydric phenol having the structure of formula (VI);

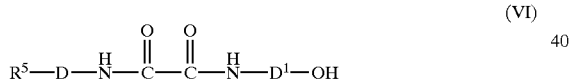

(VI)

wherein D and $D^1$ are each independently a divalent aromatic radical with the structure of formula (III):

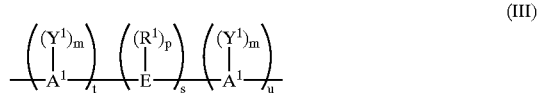

(III)

wherein $A^1$ is an aromatic group; E is at least one alkylene, alkylidene, or cycloaliphatic group; a sulfur-containing linkage; a phosphorus-containing linkage; an ether linkage; a carbonyl group; a tertiary nitrogen group; or a silicon-containing linkage; $R^1$ is hydrogen or a monovalent hydrocarbon group; $Y^1$ is selected from the group consisting of a monovalent hydrocarbon group, halogen, bromine, chlorine; nitro; and $OR^2$, wherein $R^2$ is a monovalent hydrocarbon group; "m" represents any integer from and including zero through the number of positions on $A^1$ available for substitution; "p" represents an integer from and including zero through the number of positions on E available for substitution; "t" represents an integer equal to at least one; "s" is either zero or one; "u" represents any integer including zero; and $R^5$ is selected from the group consisting of hydrogen, a monovalent hydrocarbon group; halogen, bromine, chlorine; nitro; and $OR^2$, wherein $R^2$ is a monovalent hydrocarbon group.

47. The oxanilide-comprising monohydric phenol of claim 44 which is N-(4-(1-(4-hydroxyphenyl)-1-methylethyl)phenyl)-N'-(2-ethoxyphenyl)-ethanediamide.

48. An oxamate-comprising monohydric phenol having the structure of formula (IX):

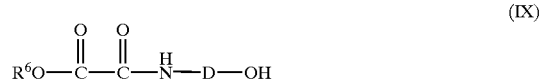

(IX)

wherein D is a divalent aromatic radical with the structure of formula (III):

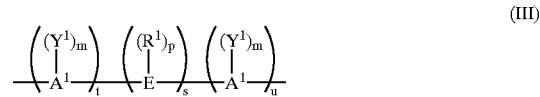

(III)

wherein $A^1$ is an aromatic group; E is at least one alkylene, alkylidene, or cycloaliphatic group; a sulfur-containing linkage; a phosphorus-containing linkage; an ether linkage; a carbonyl group; a tertiary nitrogen group; or a silicon-containing linkage; $R^1$ is hydrogen or a monovalent hydrocarbon group; $Y^1$ is selected from the group consisting of a monovalent hydrocarbon group, halogen, bromine, chlorine; nitro, and $OR^2$, wherein $R^2$ is a monovalent hydrocarbon group; "m" represents any integer from and including zero through the number of positions on $A^1$ available for substitution; "p" represents an integer from and including zero through the number of positions on E available for substitution; "t" represents an integer equal to at least one; "s" is either zero or one; "u" represents any integer including zero; and $R^6$ is a monovalent hydrocarbon group substituted with an electron-withdrawing group.

49. The oxamate-comprising monohydric phenol of claim 48 which is a compound of the formula (IX) in which D is a residue derived from 2-(4-aminophenyl)-2-(4'-hydroxyphenyl)propane and $R^6$ is trifluoroethyl.

50. An oxanilide-comprising monohydric phenol with the structure of the formula:

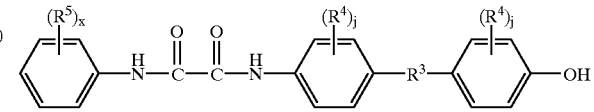

wherein $R^3$ is an alkylene, alkylidene, or cycloaliphatic group; $R^4$ and $R^5$ are each independently halogen, bromo, chloro, alkyl, aryl, aralkyl, alkaryl, cycloalkyl, or $OR^2$, wherein $R^2$ is a monovalent hydrocarbon group; and "x" and "j" represent any integer from and including zero through the number of positions on the aromatic ring available for substitution.

51. The monohydric phenol of claim 50 which is N-(4-(1-(4-hydroxyphenyl)-1-methylethyl)phenyl)-N'-(2-ethoxyphenyl)-ethanediamide.

52. A method for making a symmetrical oxanilide-comprising dihydric phenol which comprises the step of contacting an aromatic amine bearing a hydroxy group with a diaryl oxalate or a dialkyl oxalate bearing alkyl groups each substituted with at least one electron-withdrawing group.

53. The method of claim 52 wherein the electron-withdrawing group is fluoro or chloro.

54. The method of claim 52 wherein the oxanilide-comprising dihydric phenol has the structure of the formula:

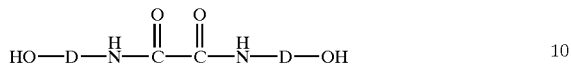

wherein D is a divalent aromatic radical with the structure of formula (III):

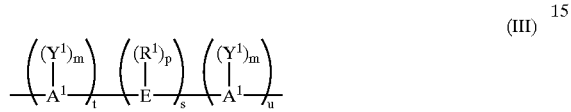

(III)

wherein $A^1$ is an aromatic group, E is at least one alkylene, alkylidene, or cycioaliphatic group; a sulfur-containing linkage; a phosphorus-containing linkage; an ether linkage; a carbonyl group; a tertiary nitrogen group; or a silicon-containing linkage; $R^1$ is hydrogen or a monovalent hydrocarbon group; $Y^1$ is selected from the group consisting of a monovalent hydrocarbon group, halogen, bromine, chlorine; nitro; and $OR^2$, wherein $R^2$ is a monovalent hydrocarbon group; "m" represents any integer from and including zero through the number of positions on $A^1$ available for substitution; "p" represents an integer from and including zero through the number of positions on E available for substitution; "t" represents an integer equal to at least one; "s" is either zero or one; and "u" represents any integer including zero.

55. The method of claim 52 wherein the temperature of contacting is in a range of between about 30° C. and about 100° C.

56. A method for making a symmetrical oxanilide-comprising dihydric phenol which comprises the step of contacting an aromatic amine selected from the group consisting of 3-aminophenol, 4-aminophenol, and 2-(4-aminophenyl)-2-(4'-hydroxyphenyl)propane, with bis (trifluoroethyl)oxalate at a temperature in a range of between about 30° C. and about 100° C.

57. A method for making an unsymmetrical oxanilide-comprising dihydric phenol which comprises the steps of contacting an aromatic amine bearing a hydroxy group with a diaryl oxalate or a dialkyl oxalate bearing alkyl groups each substituted with at least one electron-withdrawing group, followed by contacting the oxamate intermediate with a second aromatic amine bearing a hydroxy group and different from said first aromatic amine.

58. The method of claim 52 wherein the electron-withdrawing group is fluoro or chloro.

59. The method of claim 57 wherein the oxanilide-comprising dihydric phenol has the structure of the formula (II):

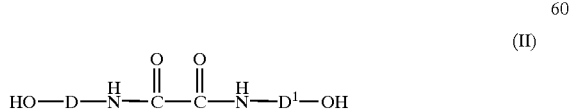

(II)

wherein D and $D^1$ are each independently a divalent aromatic radical with the structure of formula (III):

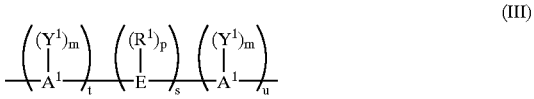

(III)

wherein $A^1$ is an aromatic group; E is at least one alkylene, alkylidene, or cycioaliphatic group; a sulfur-containing linkage; a phosphorus-containing linkage; an ether linkage; a carbonyl group; a tertiary nitrogen group; or a silicon-containing linkage; $R^1$ is hydrogen or a monovalent hydrocarbon group; $Y^1$ is selected from the group consisting of a monovalent hydrocarbon group, halogen, bromine, chlorine, nitro; and $OR^2$, wherein $R^2$ is a monovalent hydrocarbon group; "m" represents any integer from and including zero through the number of positions on $A^1$ available for substitution; "p" represents an integer from and including zero through the number of positions on E available for substitution; "t" represents an integer equal to at least one; "s" is either zero or one; and "u" represents anyinger including zero.

60. The method of claim 57 wherein the temperature of contacting is in a range of between about 30° C. and about 100° C.

61. A method for making an unsymmetrical oxanilide-comprising dihydric phenol which comprises the steps of contacting an aromatic amine bearing a hydroxy group with bis(trifluoroethyl)oxalate, followed by contacting the oxamate intermediate with a second aromatic amine bearing a hydroxy group and different from said first aromatic amine, wherein the aromatic amines are selected from the group consisting of 3-aminophenol, 4-aminophenol, and 2-(4-aminophenyl)-2-(4'-hydroxyphenyl)propane, and in each step the temperature of contacting is in a range of between about 30° C. and about 100° C.

62. A method for making an oxanilide-comprising monohydric phenol which comprises the steps of contacting an aromatic amine with a diaryl oxalate or a dialkyl oxalate bearing alkyl groups each substituted with at least one electron-withdrawing group, followed by contacting the oxamate intermediate with a second aromatic amine different from said first aromatic amine, wherein only one aromatic amine bears a hydroxy group.

63. The method of claim 62 wherein the electron-withdrawing group is fluoro or chloro.

64. The method of claim 62 wherein an oxanilide-comprising monobydric phenol has the structure of formula (VI):

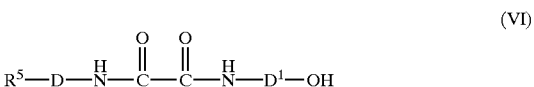

(VI)

wherein D and $D^1$ are each independently a divalent aromatic radical with the structure of formula (III):

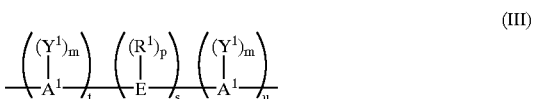

(III)

wherein $A^1$ is an aomatic group; E is at least one alkylene, alkylidene, or cycloaliphatic group; a sulfur-containing linkage; a phosphorus-containing linkage; an ether linkage; a carbonyl group, a tertiary nitrogen group; or a silicon-containing linkage; $R^1$ is hydrogen or a monovalent hydrocarbon group; $Y^1$ is selected from the group consisting of a monovalent hydrocarbon group, halogen, bromine, chlorine; nitro; and $OR^2$, wherein $R^2$ is a monovalent hydrocarbon group; "m" represents any integer from and including zero through the number of positions on $A^1$ available for substitution; "p" represents an integer from and including zero through the number of positions on E available for substitution; "t" represents an integer equal to at least one; "s" is either zero or one; "u" represents any integer including zero; and $R^5$ is selected from the group consisting of hydrogen, a monovalent hydrocarbon group; halogen, bromine, chlorine; nitro; and $OR^2$, wherein $R^2$ is a monovalent hydrocarbon group.

65. The method of claim 62 wherein the temperature of contacting is in a range of between about 30° C. and about 100° C.

66. A method for making an oxanilide-comprising monohydric phenol which comprises the steps of contacting an aromatic amine with bis(trifluoroethyl)oxalate, followed by contacting the oxamate intermediate with a second aromatic amine different from said first aromatic amine, wherein only one aromatic amine bears a hydroxy group and wherein the aromatic amines are selected from the group consisting of aniline, phenetidine, 3-aminophenol, 4-aminophenol, and 2-(4-aminophenyl)-2-(4'-hydroxyphenyl)propane, and in each step the temperature of contacting is in a range of between about 30° C. and about 100° C.

67. A method for making an oxamate-comprising monohydric phenol which comprises the step of contacting an aromatic amine bearing a hydroxy.

68. The method of claim 67 wherein the electron-withdrawing group is fluoro or chloro.

69. The method of claim 67 wherein an oxanlide-comprising monohydric phenol has the structure of formula (IX):

$$R^6O-\overset{O}{\underset{\|}{C}}-\overset{O}{\underset{\|}{C}}-\overset{H}{\underset{|}{N}}-D-OH \quad (IX)$$

wherein D is a divalent aromatic radical with the structure of formula (III):

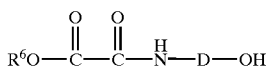
(III)

wherein $A^1$ is an aromatic group; E is at least one alkylene, alkylidene, or cycloaliphatic group; a sulfur-containing linkage; a phosphorus-containing linkage; an ether linkage; a carbonyl group; a tertiary nitrogen group; or a silicon-containing linkage; $R^1$ is hydrogen or a monovalent hydrocarbon group; $Y^1$ is selected from the group consisting of a monovalent hydrocarbon group, halogen, bromine, chlorine; nitro; and $OR^2$, wherein $R^2$ is a monovalent hydrocarbon group; "m" represents any integer from and including zero through the number of positions on $A^1$ available for substitution; "p" represents an integer from and including zero through the number of positions on E available for substitution; "t" represents an integer equal to at least one; "s" is either zero or one; "u" represents any integer including zero; and $R^6$ is a monovalent hydrocarbon group substituted with an electron-withdrawing group.

70. The method of claim 69 wherein the electron-withdrawing group is fluoro or chloro.

71. The method of claim 67 wherein the temperature of contacting is in a range of between about 30° C. and about 100° C.

72. A method for making an oxamate-comprising monohydric phenol which comprises the step of contacting an aromatic amine bearing a hydroxy group with bis(trifluoroethyl)oxalate, wherein the aromatic amines are selected from the group consisting of 3-aminophenol, 4-aminophenol, and 2-(4-aminophenyl)-2-(4'-hydroxyphenyl)propane, and in each step the temperature of contacting is in a range of between about 30° C. and about 100° C.

73. A dialkyl oxalate bearing alkyl groups each substituted with at least one electron-withdrawing group, wherein the electron-withdrawing group is at least one member selected from the group consisting of chloro and fluoro.

74. The dialkyl oxalate of claim 73 which is bis(trifluoroethyl)oxalate.

75. The polycarbonate of claim 1 further comprising structural units derived from at least one oxanilide-comprising monohydric phenol.

76. The polycarbonate of claim 75, wherein the oxanilide-comprising monohydric phenol has the structure of formula (VI).

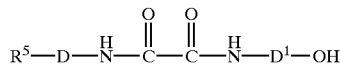
(VI)

wherein D and $D^1$ are each independently a divalent aromatic radical with the structure of formula (III):

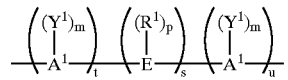
(III)

wherein $A^1$ is an aromatic group; E is at least one alkylene, alkylidene, or cycloaliphatic group; a sulfur-containing linkage; a phosphorus-containing linkage; an ether linkage; a carbonyl group; a tertiary nitrogen group; or a silicon-containing linkage; $R^1$ is hydrogen or a monovalent hydrocarbon group; $Y^1$ is selected from the group consisting of a monovalent hydrocarbon group, halogen, bromine, chlorine; nitro; and $OR^2$, wherein $R^2$ is a monovalent hydrocarbon group; "m" represents any integer from and including zero through the number of positions on $A^1$ available for substitution; "p" represents an integer from and including zero through the number of positions on E available for substitution; "t" represents an integer equal to at least one; "s" is either zero or one; "u" represents any integer, including zero; and $R^5$ is selected from the group consisting of hydrogen, a monovalent hydrocarbon group; halogen, bromine, chlorine; nitro; and $OR^2$, wherein $R^2$ is a monovalent hydrocarbon group.

77. An article comprising a polycarbonate of claim 75.

78. The polycarbonate of claim 10 wherein the oxamate-comprising compound is a monohydric phenol with the structure of formula (IX):

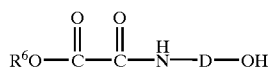

(IX)

wherein D is a divalent aromatic radical with the structure of formula (III):

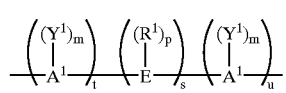

(III)

wherein $A^1$ is an aromatic group; E is at least one alkylene, alkylidene, or cycloaliphatic group; a sulfur-containing linkage; a phosphorus-containing linkage; an ether linkage; a carbonyl group; a tertiary nitrogen group; or a silicon-containing linkage; $R^1$ is hydrogen or a monovalent hydrocarbon group; $Y^1$ is selected from the group consisting of a monovalent hydrocarbon group, halogen, bromine, chlorine; nitro; and $OR^2$, wherein $R^2$ is a monovalent hydrocarbon group; "m" represents any integer from and including zero through the number of positions on $A^1$ available for substitution; "p" represents an integer from and including zero through the number of positions on E assailable for substitution; "t" represents an integer equal to at least one; "s" is either zero or one; "u" represents any integer including zero; and $R^6$ is a monovalent hydrocarbon group, optionally substituted with an electron-withdrawing group.

79. The polycarbonate of claim 78 wherein the oxamate-comprising monohydric phenol is a compound of the formula (IX) in which D is a residue derived from 2-(4-aminophenyl)-2-(4'-hydroxyphenyl)propane and $R^6$ is trifluoroethyl.

80. The oxanilide-comprising dihydric phenol made by the method of claim 52 and having the structure of formula (II):

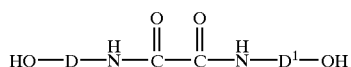

(II)

wherein D and $D^1$ are each independently a divalent aromatic radical with the structure of formula (III):

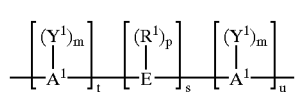

(III)

wherein $A^1$ is an aromatic group E is at least one alkylene, alkylidene, or cycloaliphatic group; a sulfur-containing linkage; a phosphorus-containing linkage; an ether linkage; a carbonyl group; a tertiary nitrogen group; or a silicon-containing linkage; $R^1$ is hydrogen or a monovalent hydrocarbon group; $Y^1$ is selected from the group consisting of a monovalent hydrocarbon group, halogen, bromine, chloxine;

nitro; and $OR^2$, wherein $R^2$ is a monovalent hydrocarbon group; "m" represents any integer from and including zero through the number of positions on $A^1$ available for substitution; "p" represents an integer from and including zero through the number of positions on E available for substitution; "t", represents an integer equal to at least one; "s" is either zero or one; and "u" represents any integer including zero.

81. The oxanilide-comprising dihydric phenol of claim 80 wherein D and $D^1$ are different.

82. The oxanilide-comprising dihydric phenol of claim 80 wherein D and $D^1$ are the same.

83. The oxanilide-comprising dihydric phenol of claim 80 which is N,N'-bis(4-(1-(4-hydroxyphenyl)-1-methylethyl)phenyl)-ethanediamide.

84. The polycarbonate comprising structural units derived from the oxanilide-comprising dihydric phenol of claim 80.

85. The polycarbonate of claim 84 wherein the amount of structural units derived from oxanilide-comprising dihydric phenol is in a range of between about 0.5 mole percent and about 50 mole percent, based on the total amount of structural units derived from dihydric phenol.

86. The polycarbonate comprising structural units derived from bisphenol-A, a carbonate precursor, and the N,N'-bis(4-(1-(4-hydroxyphenyl)-1-methylethyl)phenyl)-ethanediamide of claim 83.

87. The polycarbonate of claim 86 wherein the amount of N,N'-bis(4-(1-(4-hydroxyphenyl)-1-methylethyl)phenyl)-ethanediarnide is in a range of between about 20 mole percent and about 50 mole percent, based on the total amount of structural units derived from dihydric phenol.

88. An article comprising a polycarbonate of claim 84.

89. An article comprising a polycarbonate of claim 86.

90. The method of claim 25 wherein the polycarbonate further comprises structural units derived from at least one oxanilide-comprising monohydric phenol.

91. The method of claim 90 wherein the oxanilide-comprising monohydric phenol has the structure of formula (VI):

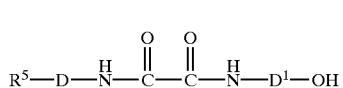

(VI)

wherein D and $D^1$ are each independently a divalent aromatic radical with the structure of formula (III):

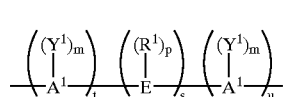

(III)

wherein $A^1$ is an aromatic group; E is at least one alkylene, alkylidene, or cycloaliphatic group; a sulfur-containing linkage; a phosphorus-containing linkage; an ether linkage; a carbonyl group; a tertiary nitrogen group; or a silicon-containing linkage; $R^1$ is hydrogen or a monovalent hydrocarbon group; $Y^1$ is selected from the group consisting of a monovalent hydrocarbon group, halogen, bromine, chlorine;

nitro; and $OR^2$, wherein $R^2$ is a monovalent hydrocarbon group; "m" represents any integer from and including zero through the number of positions on $A^1$ available for substitution; "p" represents an integer from and including zero through the number of positions on E available for substitution; "t" represents an integer equal to at least one; "s" is either zero or one; "u" represents any integer including zero; and $R^5$ is selected from the group consisting of hydrogen, a monovalent hydrocarbon group; halogen, bromine, chlorine; nitro and $OR^2$, wherein $R^2$ is a monovalent hydrocarbon group.

* * * * *